US006742939B2

(12) United States Patent
Sykora et al.

(10) Patent No.: US 6,742,939 B2
(45) Date of Patent: Jun. 1, 2004

(54) OPTICAL FIBER FUSION SPLICE HAVING A CONTROLLED MODE FIELD DIAMETER EXPANSION MATCH

(75) Inventors: Craig R. Sykora, New Richmond, WI (US); James R. Onstott, Dresser, WI (US); Mark T. Anderson, Woodbury, MN (US); Craig R. Schardt, Saint Paul, MN (US); Lawrence J. Donalds, Mahtomedi, MN (US); Alessandra O. Chiareli, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

(21) Appl. No.: 10/159,375

(22) Filed: May 30, 2002

(65) Prior Publication Data

US 2003/0031432 A1 Feb. 13, 2003

Related U.S. Application Data

(60) Provisional application No. 60/294,740, filed on May 30, 2001.

(51) Int. Cl.$^7$ .................................. G02B 6/255
(52) U.S. Cl. .................. 385/96; 385/95; 385/123; 385/127
(58) Field of Search ............................ 385/96, 127, 95, 385/123

(56) References Cited

U.S. PATENT DOCUMENTS

| | | | |
|---|---|---|---|
| 3,981,707 A | 9/1976 | Araujo et al. ................... 65/3 |
| 4,206,968 A | 6/1980 | Suganuma et al. ....... 350/96.33 |
| 4,772,302 A | 9/1988 | Abe .......................... 65/3.12 |
| 4,852,968 A | 8/1989 | Reed ....................... 350/96.33 |
| 4,859,222 A | 8/1989 | Bauch et al. ................ 65/3.12 |
| 5,158,587 A | 10/1992 | Kyoto et al. ................. 65/3.12 |
| 5,235,666 A | 8/1993 | Ooe et al. .................... 385/144 |
| 5,262,365 A | 11/1993 | Oyobe et al. ................. 501/54 |
| 5,355,429 A | 10/1994 | Lee et al. .................... 385/136 |
| 5,381,503 A | 1/1995 | Kanamori et al. .......... 385/123 |
| 5,778,129 A | 7/1998 | Shukunami et al. |
| 5,798,306 A | 8/1998 | Dickinson, Jr. ............... 501/57 |
| 5,809,189 A | 9/1998 | Murphy et al. ................ 385/43 |
| 5,881,197 A * | 3/1999 | Dong et al. |
| 5,955,388 A | 9/1999 | Dejneka ....................... 501/3 |
| 6,077,799 A | 6/2000 | Dejneka et al. ............... 501/37 |
| 6,109,065 A | 8/2000 | Atkins et al. ................. 65/399 |
| 6,128,430 A | 10/2000 | Chu et al. .................... 385/142 |
| 6,336,749 B1 * | 1/2002 | O'Toole et al. ............... 385/96 |
| 6,356,694 B1 | 3/2002 | Weber ........................ 385/132 |
| 2002/0159723 A1 * | 10/2002 | Riis et al. ..................... 385/95 |
| 2003/0012526 A1 * | 1/2003 | Riis et al. ..................... 385/96 |
| 2003/0026565 A1 * | 2/2003 | Anderson et al. ............ 385/141 |

FOREIGN PATENT DOCUMENTS

| | | | |
|---|---|---|---|
| EP | 0091738 A2 | 10/1983 | |
| EP | 0 443 781 A1 | 8/1991 | |
| EP | 0469792 A2 | 2/1992 | |
| EP | 0 469 795 A1 | 2/1992 | |
| EP | 1 094 346 A1 | 4/2001 | |
| EP | 1 174 741 A1 | 1/2002 | |
| EP | 1 202 090 A1 | 5/2002 | |
| JP | 60263103 | 6/1984 | ............ G02B/6/22 |
| JP | 61191544 | 8/1986 | ............ C03C/13/04 |
| JP | 61222940 | 10/1986 | ............ C03C/13/04 |
| JP | 63248731 | 4/1987 | ............ C03B/37/018 |
| WO | WO89/10332 | 2/1989 | ............ C03B/37/14 |
| WO | WO98/54607 | 3/1998 | ............ G02B/6/00 |
| WO | WO99/04298 | 1/1999 | ............ G02B/6/22 |
| WO | WO 99/28255 | 10/1999 | ............ C03C/3/11 |
| WO | WO00/58232 | 5/2000 | ............ C03B/37/012 |
| WO | WO00/55660 | 9/2000 | ............ G02B/6/13 |
| WO | WO 01/92173 A1 | 5/2001 | |

OTHER PUBLICATIONS

Dianov, et al., "Application of Reduced–Pressure Plasma CVD Technology to the Fabrication of Er–Doped Optical Fibers", 8397 Optical Materials, Aug. 3, 1994, No. 3, Amsterdam, NE, pp. 181–185.

M. Hamada, et al, "Characteristics of Fusion Splice of Er$^{3+}$–Doped Fiber for Optical Amplifier"; *Proceedings of the European conference on Optical Communication (ECOC) Regular Papers*; Berlin (Sep. 27. 2002); vol. 1, conference 18; pp. 505–508.

John B. MacChesney, et al., "Depressed Index Substrate Tubes to Eliminate Leaky–Mode Losses in Single–Mode Fibers", 1985 IEEE, Journal of Lightwave Technology, vol. LT–3, No. 5, Oct. 1985, pp. 942–945.

J. Kirchhof, et al., "Diffusion Behaviour of Fluorine in Silica Glass", Journal of Non–Crystalline Solids, 181, 1995, pp. 266–273.

C. M. Miller, et al., "Optical Fiber Splices and Connectors: Theory and Methods", Dekker, New York 1986, Chapter 4.

P. C. Becker, et al., "Amplifier Characterization and Design Issues" *Erbium–Doped Fiber Amplifiers*, Academic Press, CA 1999, Chapter 8, p. 264.

(List continued on next page.)

Primary Examiner—Hemang Sanghavi
Assistant Examiner—Eric Wong
(74) Attorney, Agent, or Firm—Gregg H. Rosenblatt; Alan Ball

(57) ABSTRACT

A fusion splice including a first optical fiber having a first MFD and a first MFD expansion rate. The splice further includes a second fiber having a second MFD and a second MFD expansion rate, wherein the second MFD is lower than the first MFD. The second fiber comprises a core, a cladding radially surrounding the core, and a zone of high-concentration of fluorine between the core and the cladding. The rate of MFD expansion of the first fiber is less than the rate of MFD expansion of the second fiber during the fusion splicing operation.

19 Claims, 7 Drawing Sheets

OTHER PUBLICATIONS

H. Y. Tam, *"Simple Fusion Splicing Technique for Reducing Splicing Loss Between Standard Singlemode Fibres and Erbium–Doped Fibre"*, Electronics Letters, 15$^{th}$ Aug. 1991, vol. 27, No. 17, pp. 1597–1599.

C. P. Botham, *"Theory of Tapering Single–Mode Optical Fibres by Controlled Core Diffusion"*, Electronic Letters, No. 24, 1988, pp. 243–244.

J. T. Krause, et al., *"Splice Loss of Single–Mode Fiber as Related to Fusion Time, Temperature, and Index Profile Alteration"*, IEEE Journal of Lightwave Technology, LT–4, 1986, pp. 837–840.

M. Onishi, et al, "Dispersion compensating fibre with a high figure of merit of 250ps/nm/dB", *Electronics Letters*, IIE Stevenage, GB, vol. 30, No. 2, Jan. 20, 1994 (pp. 161–163).

* cited by examiner

OPTICAL FIBER FUSION SPLICE HAVING A CONTROLLED MODE FIELD DIAMETER EXPANSION MATCH

RELATED APPLICATIONS

The present case is related to and claims priority from co-pending, commonly-owned U.S. Provisional Application No. 60/294,740, filed May 30, 2001, entitled, "Optical Fiber Including A Fluorine-Containing Zone", and to co-pending, commonly-owned, U.S. application Ser. No. 09/934,388 entitled "Optical Waveguide Article Including A Fluorine-Containing Zone", which was filed on Aug. 21, 2001, both of which are hereby incorporated by reference. The present case is also related to and claims priority from co-pending, commonly-owned U.S. Provisional Application No. 60/294,741, filed May 30, 2001, entitled, "Method of Manufacture of an Optical Waveguide Article Including a Fluorine-Containing Zone", and to co-pending, commonly-owned, U.S. application Ser. No. 09/934,361 entitled "Method of Manufacture of an Optical Waveguide Article Including a Fluorine-Containing Zone", which was filed on Aug. 21, 2001, both of which are hereby incorporated by reference.

BACKGROUND OF THE INVENTION

The present invention relates to fusion splicing of optical fibers. In particular, the present invention relates to an optical fiber fusion splice where at least one of the fibers has a controlled rate of mode field diameter (MFD) expansion to match the MFD of the other fused fiber.

Fusion splicing uses an electric arc to weld ends of two optical fibers together. The goal is to match the fibers to achieve the lowest possible signal loss. Extremely high temperatures (~2,000° C.) are used to melt the silica glass ends of the fibers, which are then positioned together and allowed to cool and fuse. Single-mode fibers require precise alignment of the cores of the fibers. To minimize optical loss, it is desirable to match the MFD of the two fibers. Extremely sophisticated, computer-controlled equipment is used to align the fibers and monitor the optical match.

Erbium-doped fiber (EDF) is especially challenging to fusion splice because it requires a small core and high numerical aperture in order to maximize efficiency, thereby decreasing MFD. This issue is further complicated by the differing diffusion rates of dopant ions in EDF and the fibers it would be spliced to, such as those found in Erbium-doped fiber amplifier (EDFA) pump combiners.

Previous methods applied to EDF splicing involved intentionally expanding the MFD of the lower MFD fiber, by virtue of diffusion of index-raising ions out of the core of the fiber, to match the MFD of the second fiber. Index raising ion diffusion has the dual effect of lowering the refractive index of the core while simultaneously increasing the effective core size.

However, while the MFD expansion is desirable, the rate at which it occurs often proves to make control of it difficult. The dual effect of lowering index while increasing core size makes it extremely hard to stop the MFD expansion process at the correct time. For example, when an amplifier manufacturer utilizes EDF they may have problems with fusion times that are adequate for MFD expansion being too short to give adequate mechanical strength. Furthermore, short fusion times make it difficult to control tolerances of the fusion splicer, leading to problems with repeatability.

The matching problem becomes even more complicated as changes in the splicer due to buildup of silica on the electrodes (changes in fusion current, arc position, arc stability) have a greater effect because there is less fusion time for the instabilities to be averaged out.

Many of the previous efforts have focused on attempts to increase the expansion of a fiber core (and thus the MFD rather than slow it. One example discloses a design that utilizes fluorine diffusion into the core of a fiber in order to decrease the core's index difference relative to the cladding, thereby increasing the MFD expansion rate. Another related example describes a method of intentionally diffusing index-raising core dopants to increase MFD to optimize splice loss.

The need remains for a regularly MFD-matched fusion splice and a repeatable method for achieving such a splice.

SUMMARY OF THE INVENTION

The present invention is directed to an optical fusion splice including an optical fiber having a fluorine ring between the core and the cladding. The fusion splice of the present invention, while allowing MFD expansion, gives the benefit of higher control over the process via the slowing of MFD expansion. Moreover, since the resulting curve of the rate of MFD expansion is predictable and may be controlled by the chemical composition of the fluorine containing fiber, the present invention allows the user to match the desired fusion time ranges with the desired MFD expansion rates.

A fusion splice in accordance with the present invention includes a first optical fiber having a first MFD and a first MFD expansion rate. The splice further includes a second fiber having a second MFD and a second MFD expansion rate, wherein the second MFD is lower than the first MFD. The first fiber may have a lesser concentration of index-raising dopants in the core than the second fiber or the first fiber may have a lower diffusivity of index-raising dopants in the core than the second fiber. The second rate of MFD change of the second fiber may be controlled by the amount of fluorine in the zone.

The second fiber comprises a core, a cladding, radially surrounding the core, and a zone of high-concentration of fluorine between the core and the cladding. High concentration is defined as when the fluorine concentration in the zone is greater than the fluorine concentration in either the core or the cladding. In a particular exemplary embodiment the maximum concentration of fluorine in the zone is between 0.5 to 6 mol %. The rate of MFD expansion of the first fiber is less than the rate of MFD expansion of the second fiber during the fusion splicing operation.

The core of the second fiber may be erbium doped, Al doped and/or La doped. The second fiber may also further comprise at least one diffusion barrier layer.

Likewise, the first fiber also may include a core, a cladding, and a zone of high-concentration of fluorine intermediate the core and the cladding, wherein the rate of MFD change of the first fiber is controlled by the amount of fluorine and the amount of index raising dopants.

A variety of devices may benefit from a fusion splice according to the present invention. A broadband amplifier including the fusion splice is contemplated wherein the first and the second fibers provide amplification for different wavelengths. Similarly, a broadband amplifier including the fusion splice, where only the second fiber provides amplification. The first fiber may be a pump laser combiner or a pump laser pigtail. These devices may be part of telecommunication systems.

A method for fusion splicing a first and a second optical fiber in accordance with the present invention includes the steps of providing a first fiber having a first MFD and a first MFD expansion rate upon heating and providing a second fiber having a second MFD and a second MFD expansion rate. The second MFD is less than the first MFD, and the second MFD expansion rate is greater than the first MFD expansion rate. The second fiber comprises a core, a cladding radially surrounding the core, and a high concentration F-ring intermediate the core and the cladding. The average concentration of F in the ring is higher than that of the center of the core or the outer edge of the cladding. The F-ring reduces the rate of MFD expansion of the second fiber when compared to a similar fiber without the F-ring.

The two fibers are then fused by applying heat to the end faces of each fiber and bringing them into close contact and optical alignment, while matching the MFD of the first and second fibers. The MFD of both the first and the second fiber may be monitored during the step of fusing, wherein the step of applying heat is controlled to achieve MFD matching. Alternatively, where the rates of MFD expansion of the first and second fiber are known, heat may be applied for a predetermined time and at a predetermined temperature, known to be the intersection of the first and second MFD expansion curves.

DETAILED DESCRIPTION OF THE INVENTION

Figure 1:
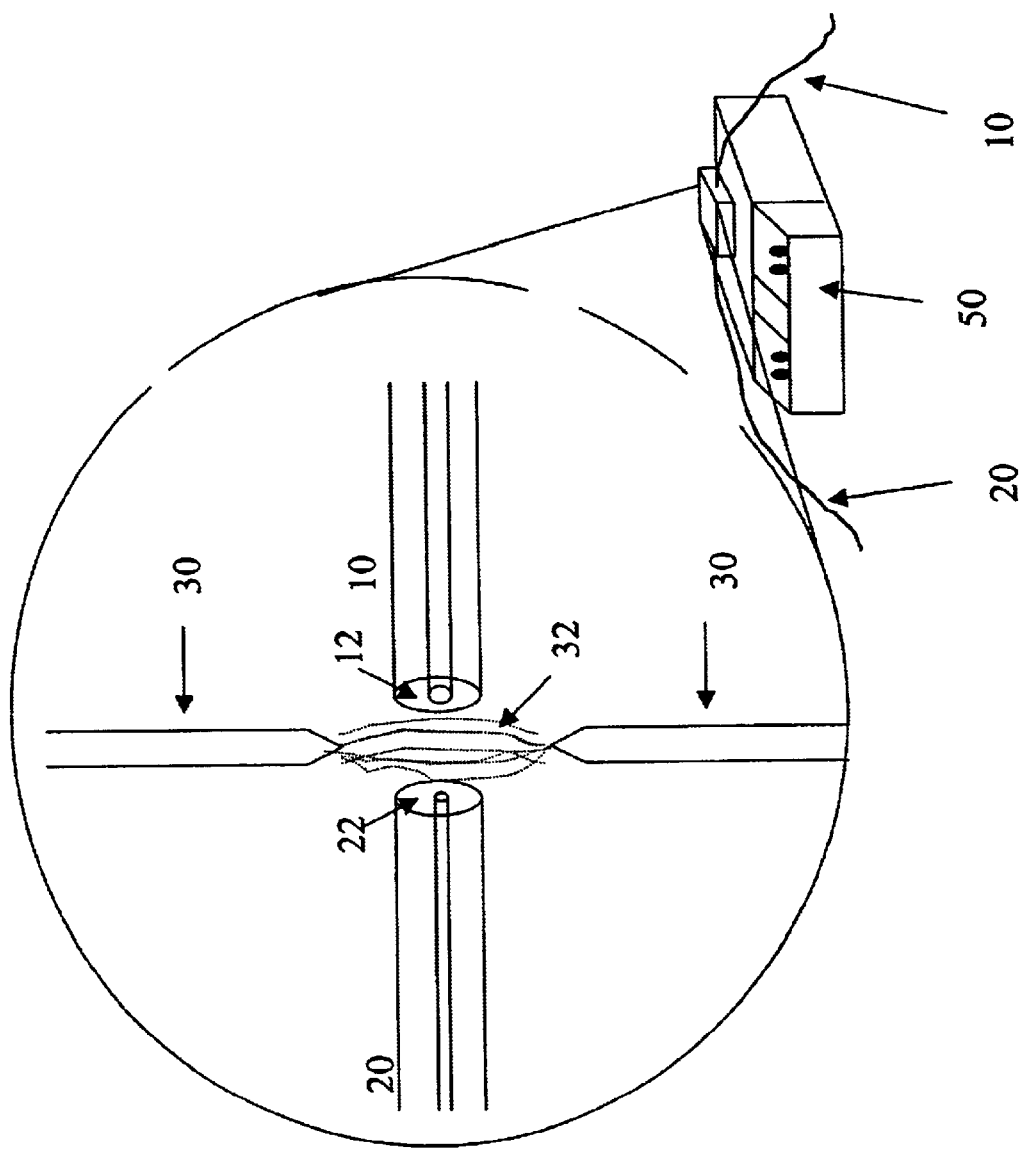
FIG. 1 is an illustration of a method for fusion splicing in accordance with the present invention.

FIG. 1 illustrates a method of fusion splicing a first optical fiber 10 and a second optical fiber 20 in accordance with the present invention using a fusion splicer 50. The method comprises the step of providing the first fiber 10 having a first MFD and a first MFD expansion rate and providing the second fiber 20 having a second MFD and a second MFD expansion rate, wherein the second MFD is less than the first MFD, and the second MFD expansion rate is greater than the first MFD expansion rate. In an exemplary embodiment, the first fiber 10 has a lesser concentration of index raising dopants in the core than the second fiber 20. In an alternative embodiment, the first fiber 10 has a lower diffusivity of index-raising dopants in the core than the second fiber 20.

Ends 12 and 22 of the optical fibers 10 and 20 respectively are aligned and are placed between two electrodes 30. An electrical voltage is held between the two electrodes, creating an electrical arc 32 between them.

The electrical arc 32 applies intense heat to the fiber ends 12 and 22, melting them. The ends 12 and 22 are then brought into close contact and optical alignment, while matching the MFD of the first and second fiber.

In one exemplary embodiment, the first optical fiber 10 is a conventional pigtail fiber, such as SMF-28, by Corning, USA. The second optical fiber 20 comprises a core, a cladding radially surrounding the core, and a high-concentration F-ring intermediate the core and the cladding, wherein the average concentration of F in the ring is higher than that of the center of the core or the outer edge of the cladding. The F-ring reduces the rate of MFD expansion of the second fiber when compared to a similar fiber without the F-ring.

In another embodiment, both the first and the second fiber, 10 and 20 respectively, include a core, a cladding, and an F-ring, that is, an area of high concentration of fluorine straddling the boundary between the core and the cladding.

The MFD of both the first and the second fiber may be monitored during the step of fusing and the time and/or temperature of exposure may be controlled to achieve MFD matching. Alternatively, where the rates of MFD expansion of the first and second fiber are known, the step of applying heat may includes applying pre-calculated time and/or temperature exposures to cause the MFD expansion vs. time curves to intersect.

Figure 2:
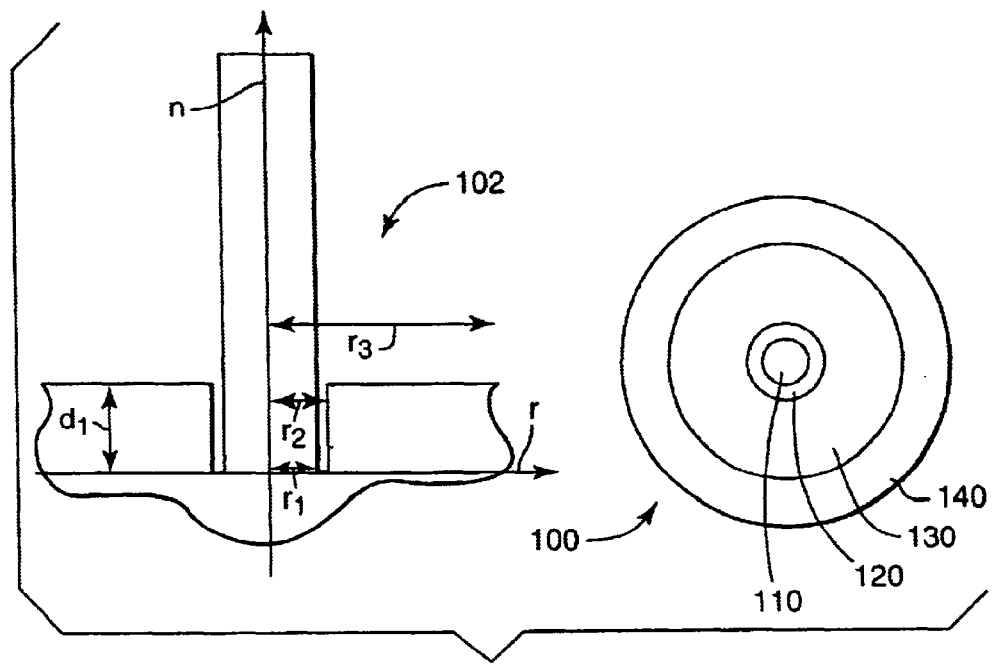
FIG. 2 is a depiction of the refractive index profile and a corresponding schematic cross-section of a first embodiment of an optical fiber having a matched-clad depressed-ring (MCDR) design in accordance with the present invention.

FIGS. 2–9 illustrate multiple exemplary compositions for the second fiber. FIG. 2 illustrates the refractive index profile depiction and schematic cross-section of a first embodiment of an optical fiber 100 in accordance with the present invention. FIGS. 3–9 similarly illustrate the refractive index profile and cross-section of a second, third, fourth, fifth, and sixth embodiment, respectively, of optical fibers in accordance with the present invention. Similar elements are identified using reference numerals having the same last two digits. The axes of the refractive index profile depictions for FIGS. 2–7 are distance from center (r) vs. refractive index (n). The axes are unitless and the n-axis is not necessarily intersected at the zero point by the r axis, because the purpose of the Figures is to illustrate the profile shapes and index relations rather than profiles for specific optical articles. Please note that the drawings are for illustrative purposes only, and are not necessarily meant to be to scale. Those skilled in the art will readily appreciate a variety of other designs that are encompassed by the present invention.

FIG. 2 includes a depiction of the refractive index profile 102 and a corresponding schematic cross-section of a first embodiment of an optical fiber 100 having a matched-clad depressed-ring (MCDR) design in accordance with the present invention. The article 100 includes a core 110 having a radius $r_1$, a fluorine-containing zone or ring 120 having a radius $r_2$ surrounding and concentric with the core, one or more cladding layers 130 having a radius $r_3$ adjacent to the ring 120 and concentric with the core, and a substrate tube 140 surrounding the cladding layer 130. The cladding 130 is a layer of high purity glass concentric with the core 110. The cladding 130 may be circular, oval, square, rectangular, or other shapes in cross-section. In, for example, a modified chemical vapor deposition (MCVD) optical preform used for making optical fibers, the substrate tube 140 is a high-silica tube, which is hollow before formation of the inner layers, tube collapse, and fiber drawing. The base component of the core 110, the zone 120, and the cladding layers 130 generally also is silica, doped with different chemicals for desired optical and mechanical characteristics. In alternative embodiments, the cladding layer 130 may include more than one cladding layer.

While FIGS. 2–9 schematically illustrate the cross-sectional index profile for an optical fiber, it must be understood that the fluorine zone generally diffuses into the core and/or the cladding during fiber drawing, creating a fluorine high-concentration "zone" rather than a sharply defined ring. In the present and following embodiments, it must be understood that when the fluorine has been diffused, a given portion of the fluorine concentration zone will be functionally either part of the cladding or core with respect to optical performance. The concentration of fluorine in the zone 120 is greater than that in the innermost cladding 130 and the core 110. Optionally, the zone 120 also has an index similar to that of the cladding. In the present invention, the zone 120 allows net diffusion of fluorine into the core from the surrounding glass, not diffusion of fluorine from the core to the surrounding glass.

The zone 120 also is "optically narrow". The term optically narrow is defined such that the fluorine-ring differential width (outer radius of fluorine ring minus the inner radius of the fluorine ring) is approximately less than ¼ the core diameter and that the presence of the fluorine ring does not significantly negatively impact the waveguiding properties of the final fiber. The inventive article is intended to have optical properties substantially identical to an article of similar design without the fluorine ring, referred to as the standard. Having a similar design is defined as occurring when the difference in the Δ (Δ is the core refractive index minus the refractive index of silica) of the cores of the fibers are less than 5%; the difference in the Δ of the claddings is less than 5%, the core diameters are within 2%, and the cladding diameters (minus the fluorine-ring differential width in the fluorine-ring case) are within 2%.

Negative impact is defined as not being able to simultaneously meet the following specifications in the present inventive fiber as compared to a standard fiber of similar design without the fluorine reservoir: the fundamental mode can propagate at operating wavelength, mode field diameter is 4.5 to 6 microns, background loss at operating wavelength <15 dB/km, and, for an amplifying fiber, the (second mode) cutoff is less than the amplifier pump wavelength (e.g. for erbium this is either 850–950 nm or <1480 nm, depending on the pump wavelength used for the amplifier).

A fiber in accordance with the present invention is readily spliceable and may be prepared with desirable fundamental mode cutoff, acceptable dispersion and mode field diameter, and low polarization mode dispersion. The method and article of the present invention also provide lower viscosity of the glass proximate to the core, and allow lower background attenuation than in depressed-well erbium-doped fibers without a fluorine ring. The invention also provides a method to tailor the fluorine distribution radially. As the diffusion rate of fluorine ions is much greater than that of the rare earth ions, the invention also allows embodiments having a non-equilibrium distribution of rare earth ions in an oxyfluoride glass (i.e. rare-earth-rich regions that can be fluorinated) that would not form from a homogeneous oxyfluoride melt. This can lead to a wider variety of rare earth ion sites in the glass, which contributes to a broader gain spectrum in optical amplifier fibers. Broader gain spectra are highly advantageous for dense wavelength division multiplexing (DWDM) optical amplifiers.

Referring back to FIG. 2, the zone 120 includes glass of high fluorine content proximate to the core 110. The fluorine concentration in the zone 120 is greater than the fluorine concentration in either the core 110 or the cladding 130. Concentration may be measured in mole percent using wavelength dispersive X-ray analysis (WDX) or secondary ion mass spectrometry (SIMS). The zone 120 also is generally narrower than either the core 110 or the cladding 130, and it is designed not to interfere with the optical functioning of either the core 110 or the cladding 130.

In an embodiment of the optical article of FIG. 2, the optical fiber 100 is a single mode optical fiber drawn from a preform having a matched-index cladding design ($r_3$) with a thin depressed-index ($d_1$) high-fluorine-content ring ($r_2$) around the core ($r_1$). $d_1$ is the index profile difference between the ring 120 and the cladding 130. Index profile 102 is an idealized cross-sectional index profile of the initial preform. It is intended generally that the fluorine ring (reservoir) not substantially impact the waveguiding properties of the fiber. For example, the fundamental mode cutoff still allows single-mode operation in the 1500–1650 nm region and the dispersion profile of the fiber is not significantly changed relative to a control fiber without the fluorine reservoir region.

The zone of high fluorine concentration 120 has a different chemical composition than the cladding 130. However, the reservoir region 120 will still interact with transmitted light and will serve optically as part of the cladding 130, especially in the final fiber after fluorine diffusion has occurred.

In one specific version of the embodiment illustrated in FIG. 2, the fiber has these properties: (1) NA is >0.2, preferably >0.25, (2) the mode field diameter is <6 μm, preferably <5.5 μm, (3) background attenuation measured at 1200 nm is <20 dB/km, preferably <15 dB/km, more preferably <10 dB/km, (4) fundamental mode cutoff is greater than 1800 nm (5) second mode cutoff is <1480 nm, preferably <980 nm. These same fiber specifications also may be used in embodiments of the designs in FIGS. 3–9.

Figure 3:
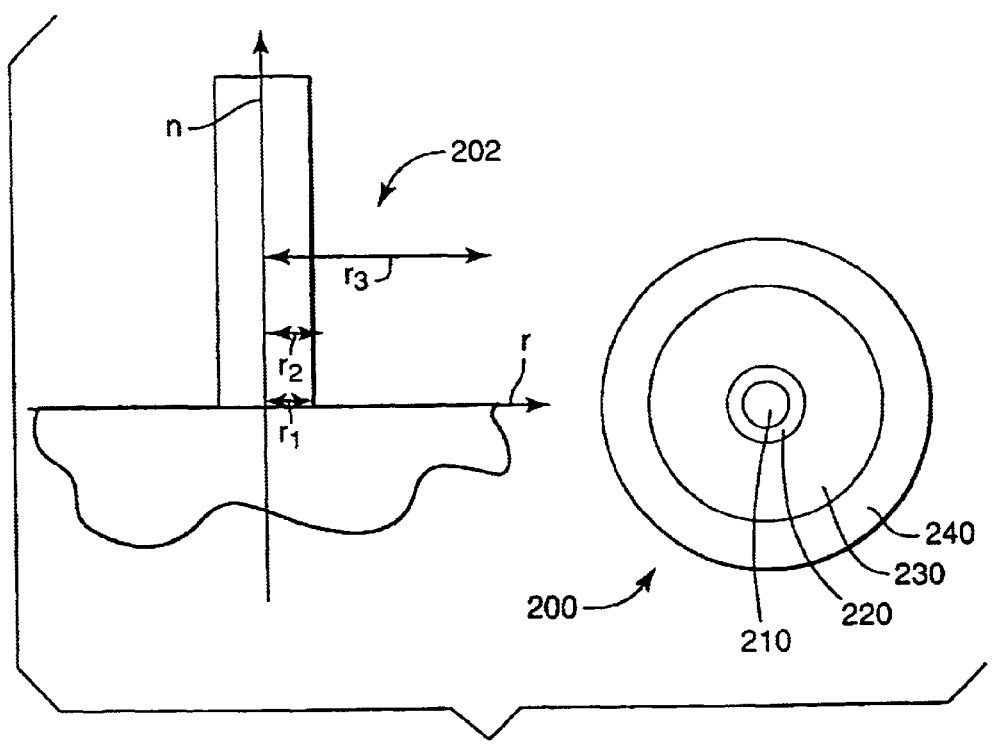
FIG. 3 is a depiction of the refractive index profile and a corresponding schematic cross-section of a second embodiment of an optical fiber having a matched-clad matched-ring (MCMR) design in accordance with the present invention.

FIG. 3 is a depiction of the refractive index profile 202 and a corresponding schematic cross-section of a second embodiment of an optical fiber 200 having a matched-clad matched-ring (MCMR) design in accordance with the present invention. In an exemplary embodiment, the optical article 200 is a single mode optical fiber and has a matched-index cladding 230 ($r_3$) with a thin matched-index high-fluorine-content ring 220 ($r_2$) around the core 210 ($r_1$). Index profile 202 is an idealized cross-sectional index profile of the initial preform.

Figure 4:
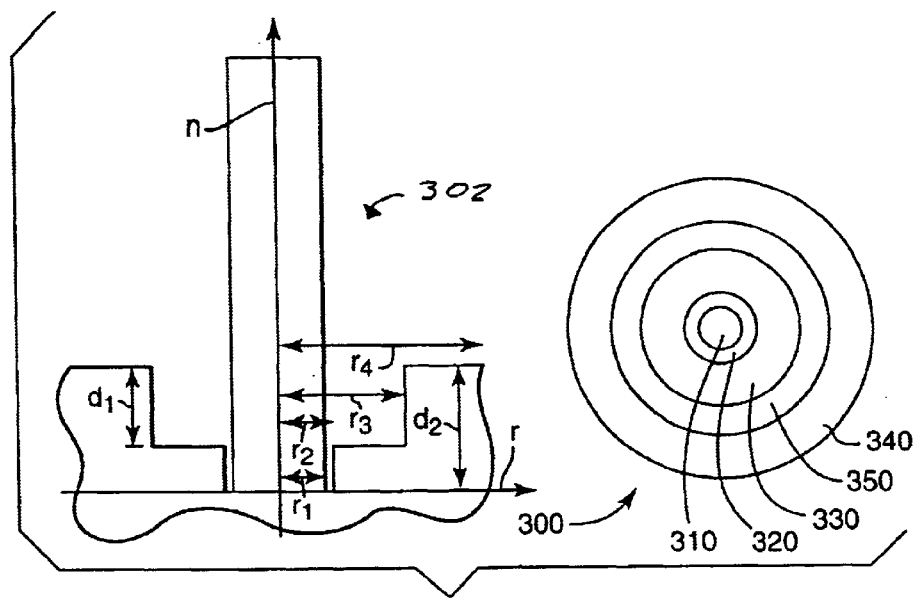
FIG. 4 is a depiction of the refractive index profile and a corresponding schematic cross-section of a third embodiment of an optical fiber having a depressed-clad lower-ring (DCLR) design in accordance with the present invention

FIG. 4 is a depiction of the refractive index profile 302 of an idealized cross-section of an initial preform and a corresponding schematic cross-section of a third embodiment of an optical fiber 300 having a depressed-clad lower-ring (DCLR) design in accordance with the present invention. In an exemplary embodiment, the optical fiber 300 is single mode optical fiber and has a depressed-index ($d_1$) inner cladding 330 ($r_3$) and outer cladding 350 design with a thin further-depressed-index ($d_2$) high-fluorine-content ring 320 ($r_2$) around the core 310 ($r_1$). $d_1$ is the "well depth", that is, index difference of the depressed index for the inner cladding with respect to the outer cladding. $d_2$ is the index difference of the refractive index for the ring with respect to the outer cladding.

Figure 5:
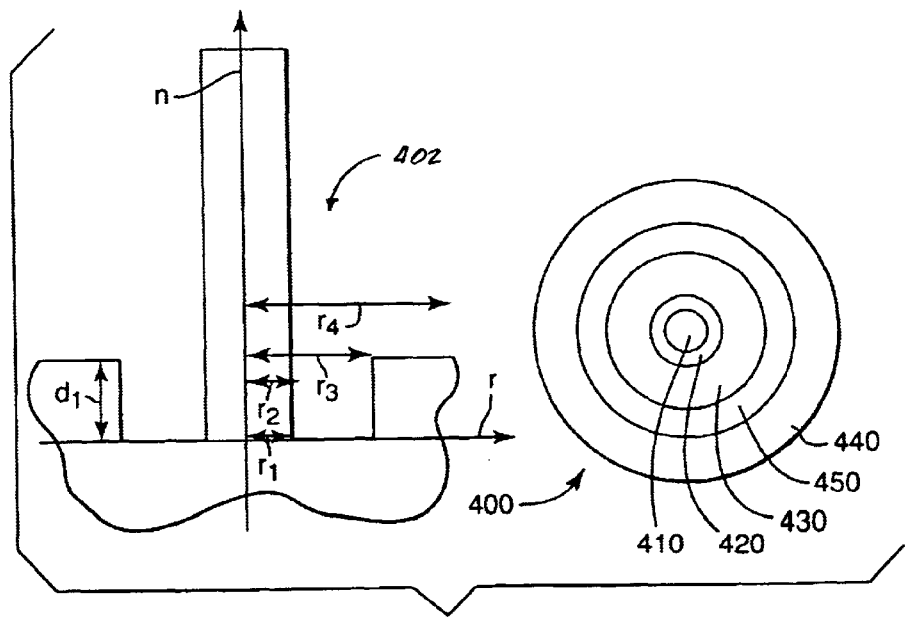
FIG. 5 is a depiction of the refractive index profile and a corresponding schematic cross-section of a fourth embodiment of an optical fiber having a depressed-clad depressed-ring (DCDR) design in accordance with the present invention.

FIG. 5 is a depiction of the refractive index profile 402 of an idealized cross-sectional profile of the initial preform and a corresponding schematic cross-section of a fourth embodiment of an optical fiber 400 having a depressed-clad depressed-ring (DCDR) design in accordance with the present invention. In an exemplary embodiment, the fiber 400 is single mode optical fiber and has a depressed-index inner cladding 430 ($r_3$) and matched-index outer cladding 450 ($r_4$) design with a thin depressed-index ($d_2$) ($d_2$ is not shown) high-fluorine-content ring 420 ($r_2$) around the core 410 ($r_1$).

Figure 6:
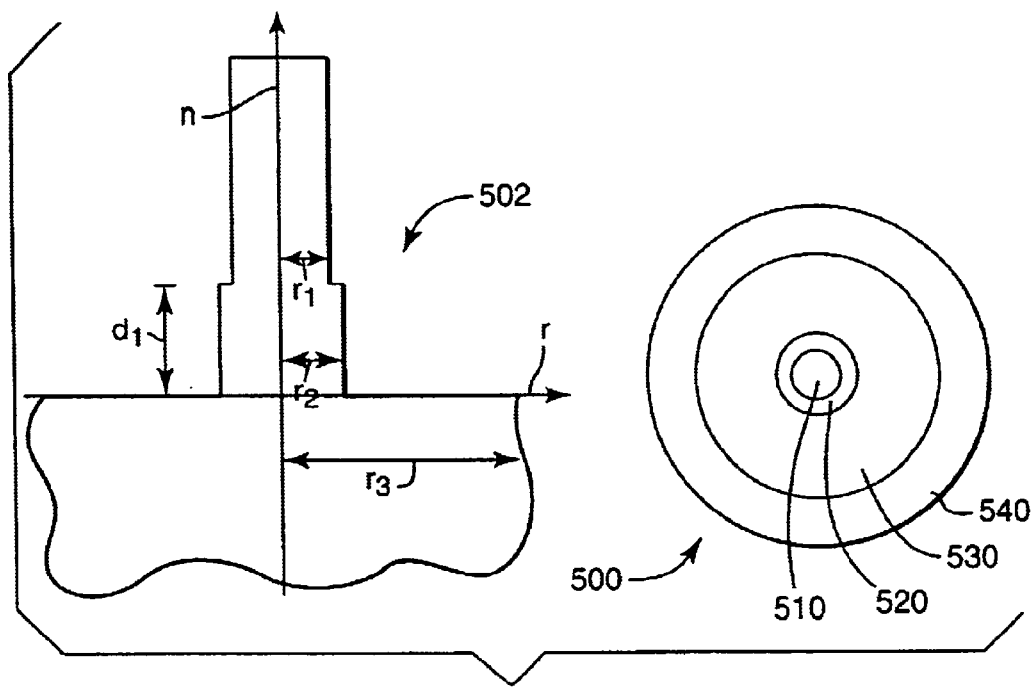
FIG. 6 is a depiction of the refractive index profile and a corresponding schematic cross-section of a fifth embodiment of an optical fiber having a matched-clad raised-ring (MCRR) design in accordance with the present invention.

FIG. 6 is a depiction of the refractive index profile 502 of an idealized cross-sectional profile of the initial preform and a corresponding schematic cross-section of a fifth embodiment of an optical fiber 500 having a matched-clad raised-ring (MCRR) design in accordance with the present invention. The present exemplary article 500 is a single mode optical fiber and has a matched-index cladding 530 design ($r_3$) with a thin raised-index high-fluorine-content ring 520 ($r_2$) approximately at the core 510/clad 530 interface ($r_1$). The core/clad interface is defined as the radial position where the measured refractive index equals the average of the equivalent step index (ESI) core and ESI clad values.

Figure 7:
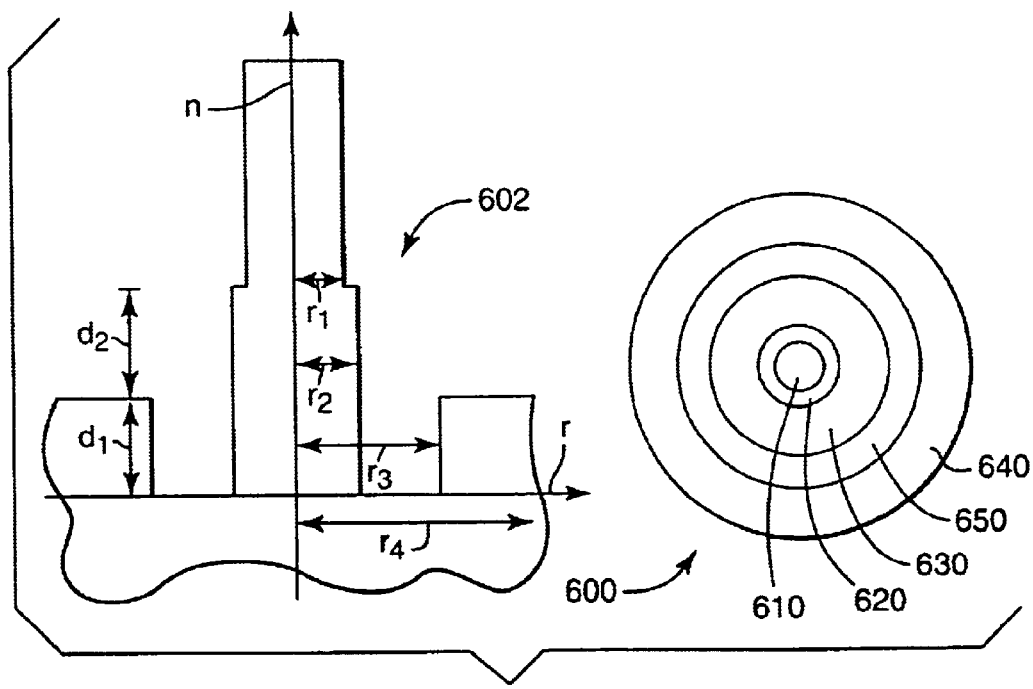
FIG. 7 is a depiction of the refractive index profile and a corresponding schematic cross-section of a sixth embodiment of an optical fiber having a depressed-clad raised-ring (DCRR) design in accordance with the present invention.

FIG. 7 is a depiction of the refractive index profile 602 of an idealized cross-sectional profile of the initial preform and a corresponding schematic cross-section of an sixth embodiment of an optical fiber 600 having a depressed-clad raised-ring (DCRR) design in accordance with the present invention. The exemplary fiber 600 is single mode optical fiber and has a depressed-index inner cladding 630 ($r_3$) and matched-index outer cladding 650 ($r_4$) with a thin raised-index ($d_2$) high-fluorine-content ring 620 ($r_2$) approximately at the core/clad interface 610 ($r_1$).

Figure 8:
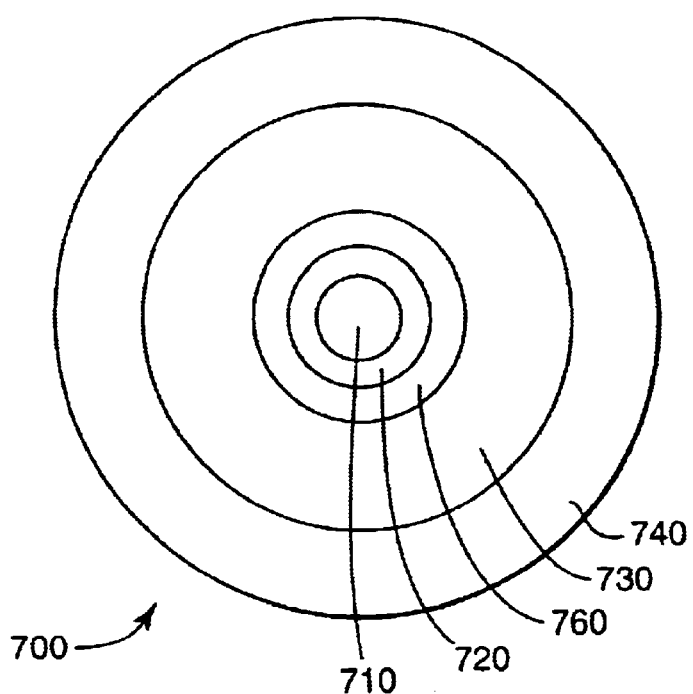
FIG. 8 is a depiction of the schematic cross-section of a seventh embodiment of an optical fiber having a barrier layer design in accordance with the present invention.
Figure 9:
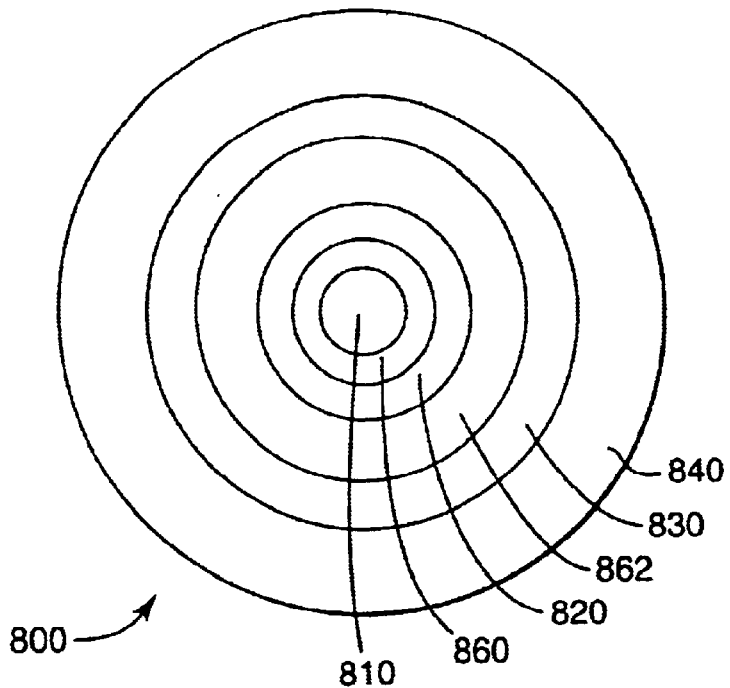
FIG. 9 is a depiction of the schematic cross-section of an eighth embodiment of an optical fiber having a double barrier layer design in accordance with the present invention.

In yet another embodiment of an optical fiber 700, illustrated in FIG. 8, a diffusion barrier 760, such as a high silica ring, is placed at a distance greater from a core 710 than the proximate fluorine ring 720. The diffusion barrier layer 760 is generally high silica or other material that decreases the diffusion rate of fluorine compared to the diffusion rate of fluorine in the cladding layers. Its purpose is to reduce the diffusion of fluorine into the cladding 730 thereby allowing more of the fluorine in the reservoir 720 to eventually diffuse into the core 710. The diffusion barrier 760 does not substantially impact the waveguiding properties of the fiber.

In contrast with references in which barrier layers have been incorporated into optical fibers to prevent diffusion of loss-raising impurities into regions near the core, the present embodiment uses barrier layers to prevent diffusion of fluorine out of the region near the core, to enhance the amount of fluorine in the core. The diffusion barrier 760 decreases the diffusion of fluorine away from the core and allows more of it to eventually diffuse into the core.

The use of a barrier layer and the reservoir concept of the present invention allows for the crafting of novel embodiments having fluorine diffusion regions. In an alternative embodiment 800, illustrated in FIG. 9, a first barrier layer 860 may be placed in or near the core region 810, exemplarily near the boundary with a zone of high-fluorine concentration 820. The first barrier layer 860 decreases the rate of diffusion of fluorine into the inner portions of the core 810. A second barrier layer 862 may be placed in or near the cladding region 830 to decrease the rate of diffusion of fluorine across the outer portions of the cladding or between cladding layers.

The F-ring erbium-doped optical fiber of the present invention offers enhanced control of mode field diameter expansion during fusion splicing. In an exemplary embodiment, when the fiber is spliced the time required for optimized mode field diameter matching with a relatively large mode field diameter fiber is approximately 2× longer than the time required for optimized splicing of a comparable erbium-doped fiber design without the fluorine containing ring around the core of the fiber. This characteristic is an advantage given that fusion characteristics for fibers without the fluorine containing ring splice too fast, that is, the fusion time is so short that it the quality of the resulting splice is low in terms of mechanical integrity and repeatability. Splices under the present invention show lower and more consistent optical loss when spliced to pigtail fibers commonly found in erbium-doped fiber amplifiers.

The significance of splice loss is understood by erbium-doped fiber amplifier (EDFA) experts. Splice loss can negatively affect the noise figure, gain tilt, and other properties of EDFAs as it affects both the pump and the signal. Current fusion splicing technology provides accurate core alignment, making the main contributor to splice loss MFD mismatch (assuming flat, perpendicular end cleaves are achieved and contamination of the end faces is avoided).

Splice loss due to mode field mismatch $\Gamma$ may be approximated using the following equation:

$$\Gamma(\omega) = 10\log\left[\frac{(2\omega_1\omega_2)}{(\omega_1^2 + \omega_2^2)}\right]^2 \tag{1}$$

where $\omega_1$ and $\omega_2$ are the mode field radii of the two fibers being spliced.

The present invention gives an advantage of lower loss and higher reliability than splices using typical rare earth-doped optical fibers. Based on splicing studies performed on fibers identical to the inventive fibers, but without the fluorine ring, the presence of fluorine around the core has the effect of slowing MFD expansion. Without wishing to be bound by theory, it is believed this is accomplished by offsetting the diffusion of index-raising dopants out of the core. It is believed that when these ions encounter the fluorine, their index-raising effect is offset by the index-lowering effect of the fluorine, causing the waveguiding dimensions of the core to be held more constant. This would reduce the rate at which the MFD is expanding (see examples below). Furthermore, splice loss results show that the inventive fiber gives the advantage of lower optical loss with greater repeatability (see table 2 below).

EXAMPLES

Figure 10:
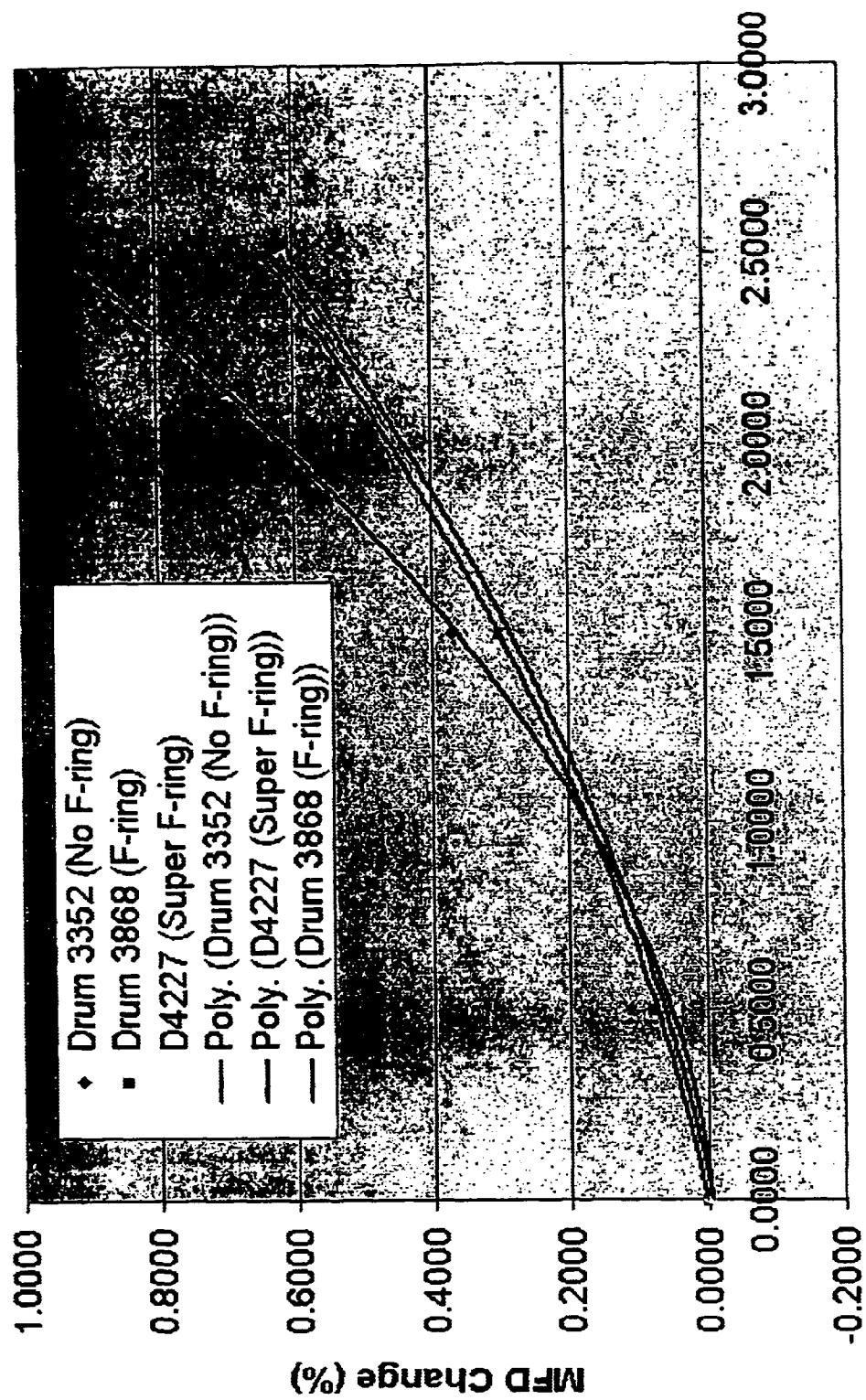
FIG. 10 is a graph of MFD % change vs. fusion time for three different fibers.

FIG. 10 is a graph illustrating MFD characteristics during fusion splicing of a fiber identical to the inventive fiber except without the fluorine ring and of two fibers produced with a fluorine ring. In FIG. 10, MFD is shown as a function of fusion time ($2^{nd}$ order polynomial fitted) showing reduction of MFD expansion for inventive fiber.

| Fiber | 2nd Order Polynomial Curve Fit Eqn. (and R squared) | Dominante MFD Expansion Rate Term |
|---|---|---|
| No F-Ring | y = 0.1302x2 + 0.0495x − 0.0063 (R^2 = 0.9996) | 13.0% |
| Standard F-Ring | y = 0.0577x2 + 0.1124x + 0.0016 (R^2 = 0.9999) | 5.8% |
| Super F-Ring | y = 0.0572x2 + 0.1074x − 0.0067 (R^2 = 0.9988) | 5.7% |

Table 1 above is a summary of curve fit data for FIG. 10, showing clear reduction in MFD expansion rate for the inventive fiber.

Figure 11:
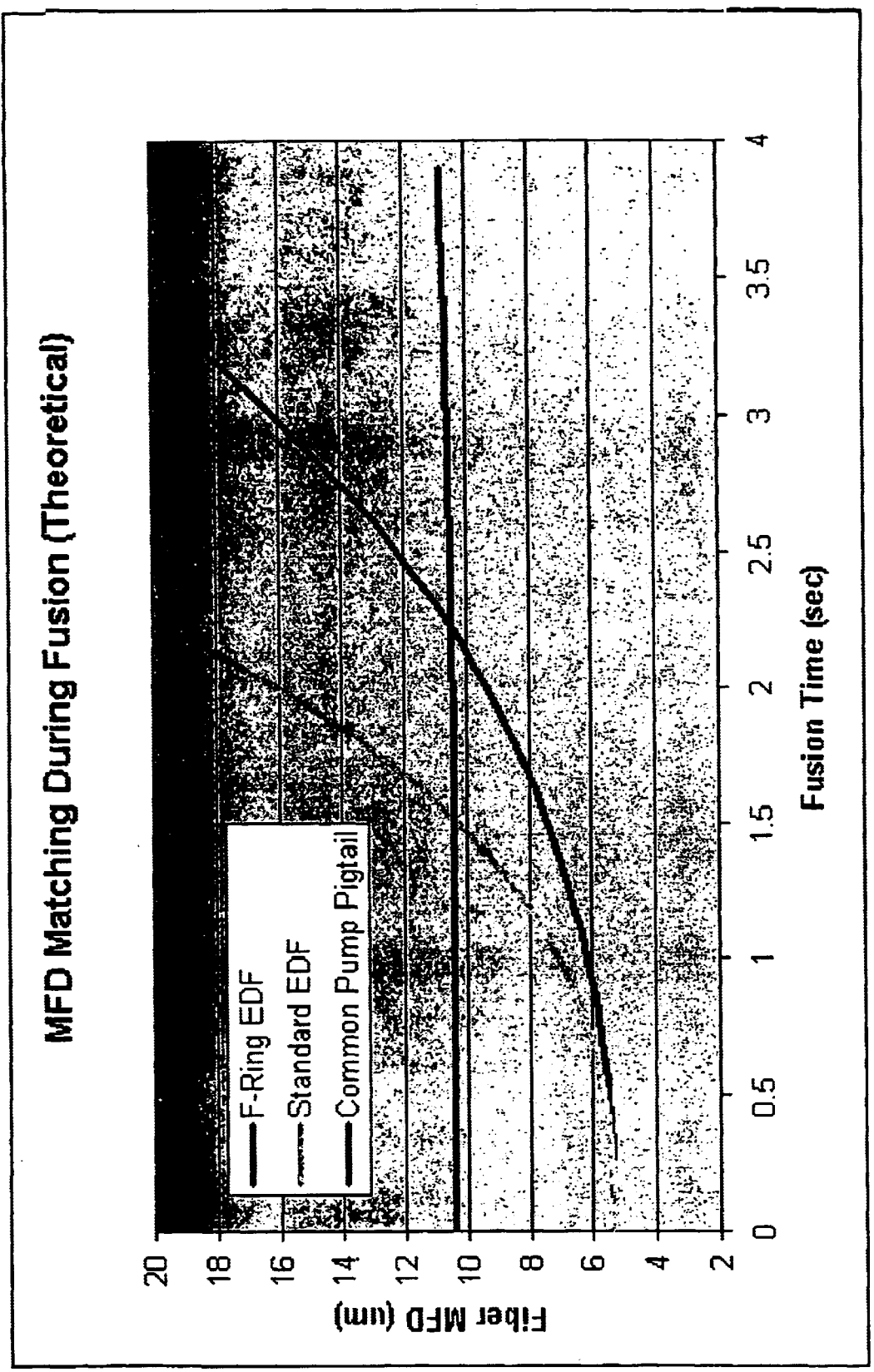
FIG. 11 is a graph of fiber MFD vs. fusion time.
Figure 2:
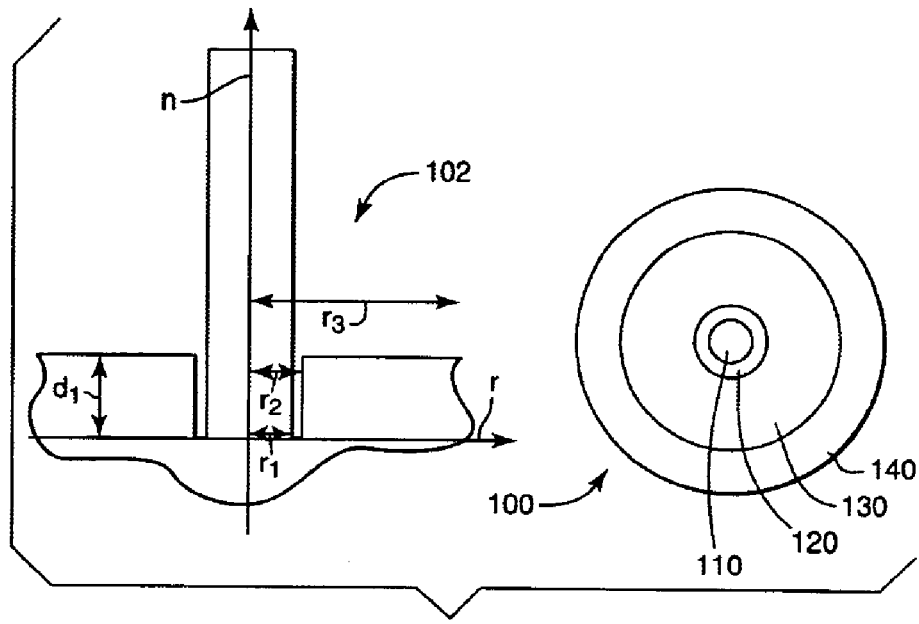
Figure 3:
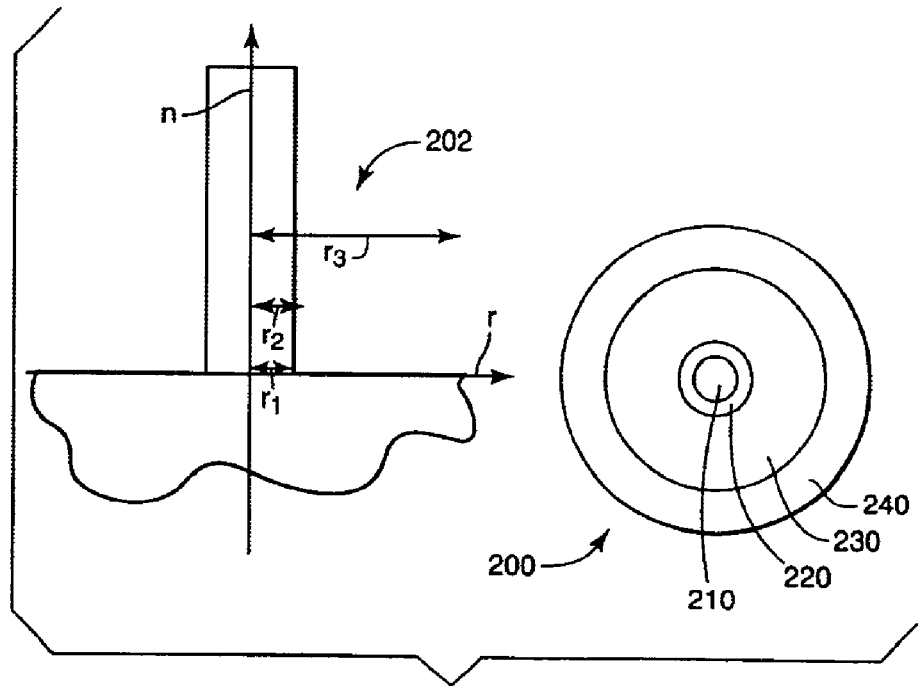
Figure 4:
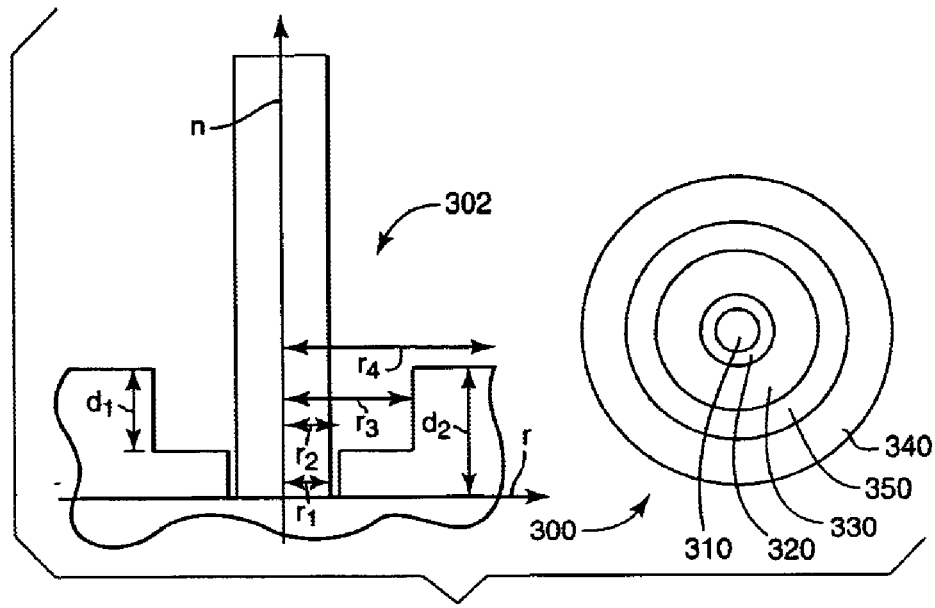
Figure 5:
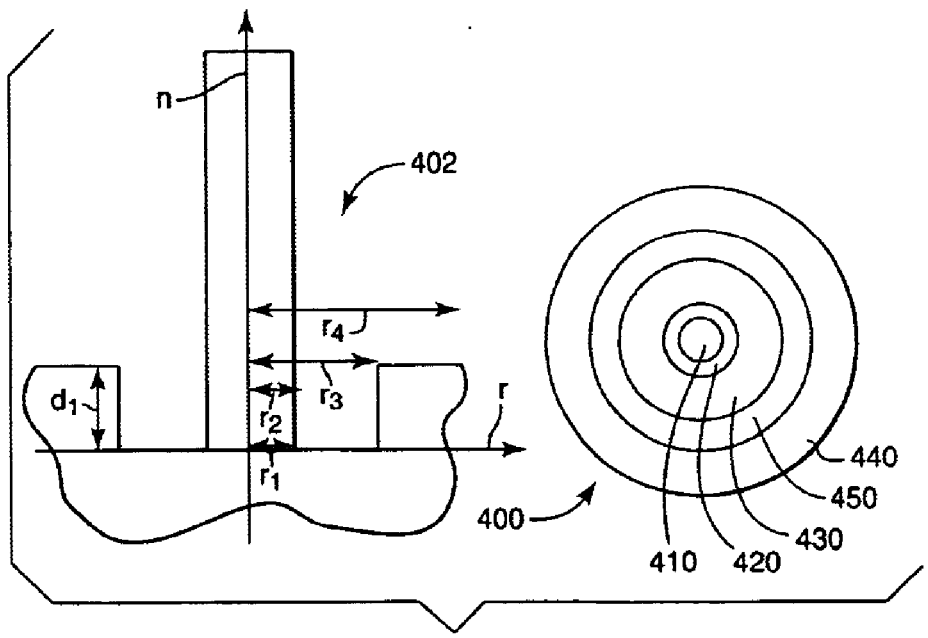
Figure 6:
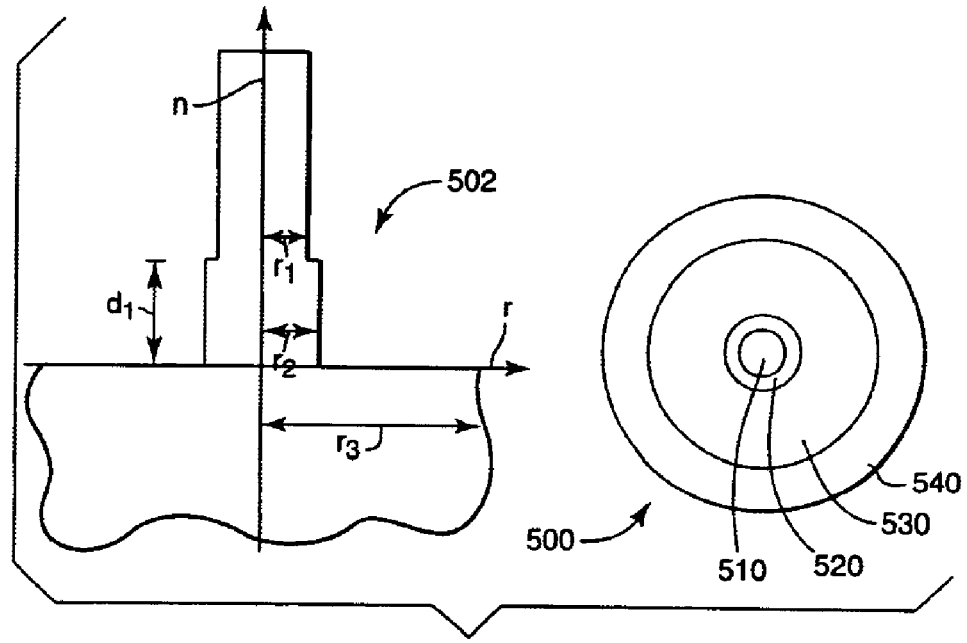
Figure 7:
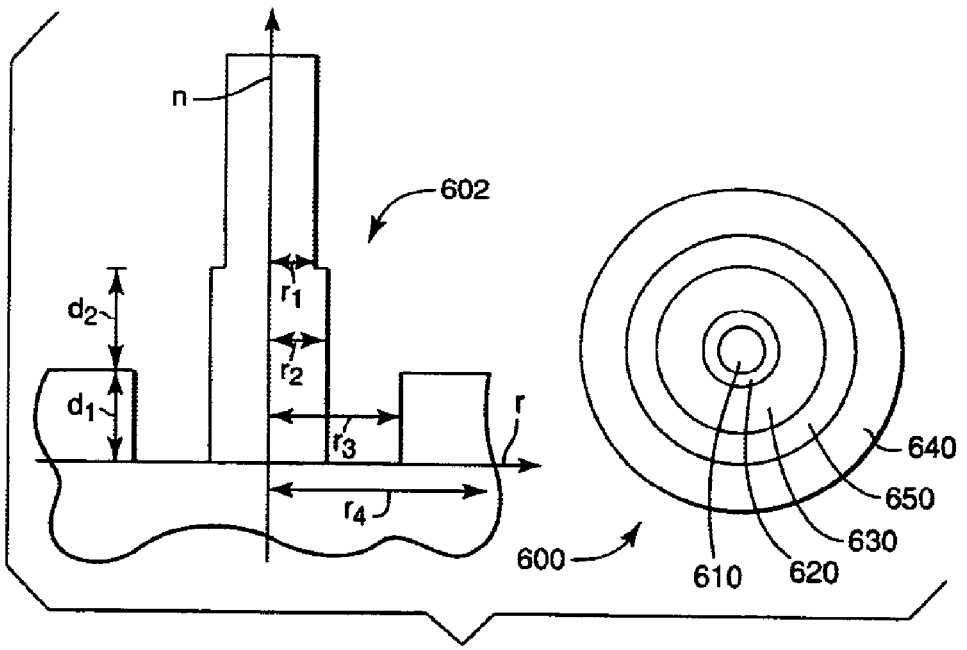
Figure 8:
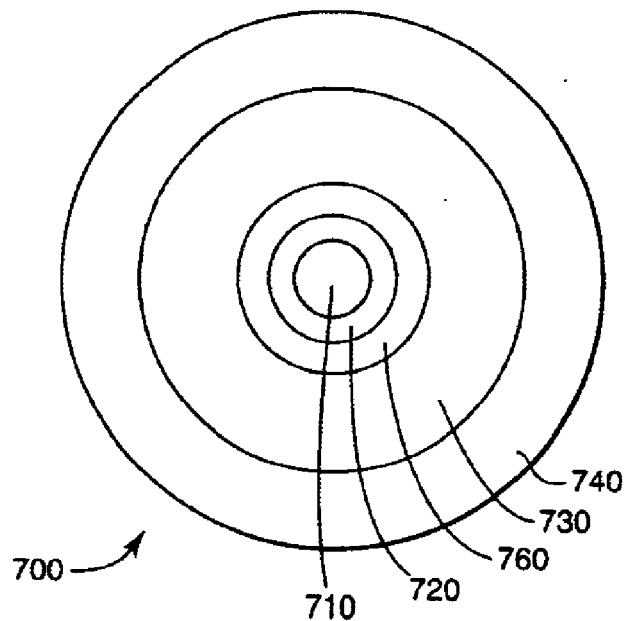
Figure 9:
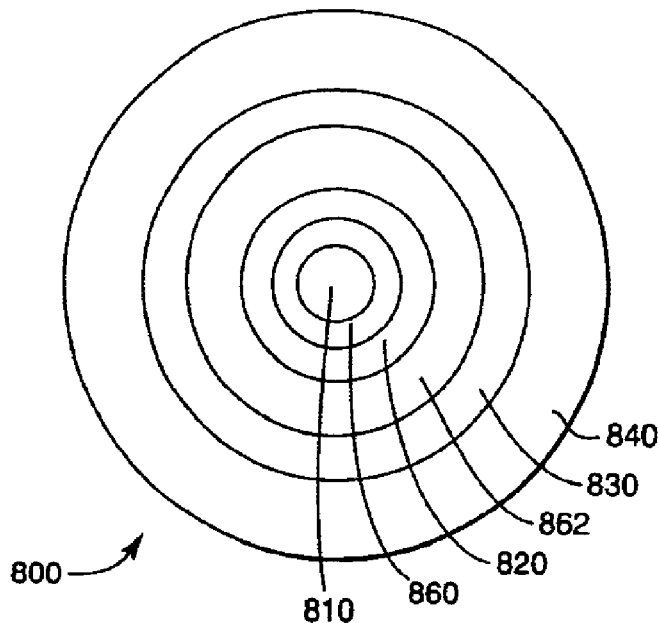
Figure 10:
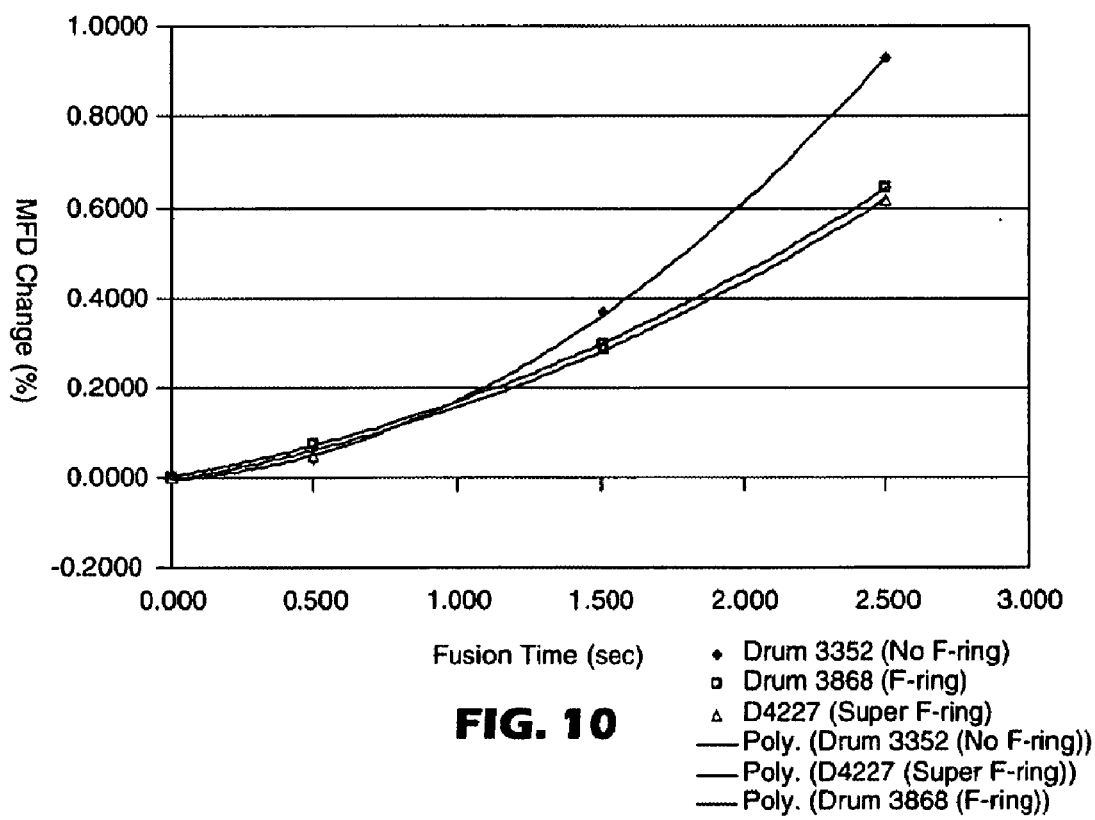
Figure 11:
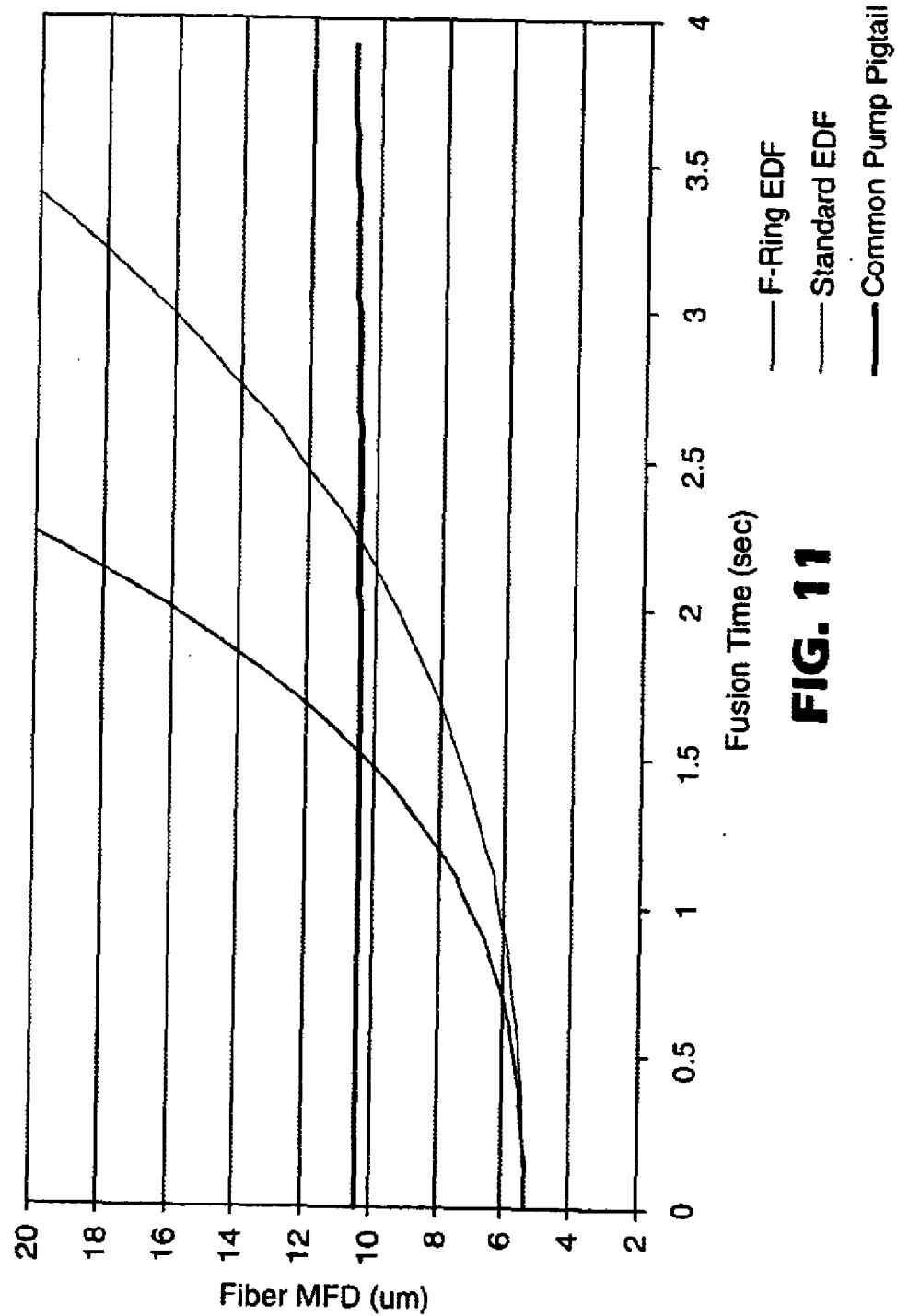

FIG. 11 is a plot of MFD changes during fusion splicing showing the point of MFD matching (established by solving equation 1 for the measured loss values shown in table 2).

Since is it known that fusion time directly affects MFD expansion by virtue of diffusion, the difference in fusion times for the optimized splicing to the large MFD fiber (SMF-28) is shown to be related to the incorporation of the fluorine ring. Supporting data is shown in table 2 for an F-ring fiber in accordance with the present invention and a comparable fiber without the fluorine ring.

|  | EDF-Corning SMF-28 | F-Ring EDF-Corning SMF-28 | EDF-Corning Flexcor 1060 | F-Ring EDF-Corning Flexcor 1060 |
|---|---|---|---|---|
| Ave. Splice Loss (dB) | 0.235 | 0.217 | 0.122 | 0.061 |
| Standard Dev. (dB) | 0.038 | 0.013 | 0.041 | 0.024 |
| Fusion Time 2 (sec)* | 1.2 | 2.2 | 0.7 | 0.6 |

*All other parameters held constant; only fusion time 2 adjusted to optimize splice loss Table 2 above is a summary of splice results comparing EDF without fluorine and EDF with fluorine to compensate for core dopant diffusion. Starting MFD of the fibers was 5.17 um for the fiber without the fluorine ring; 5.15 um for the fiber with the fluorine ring (all data at 1550 nm).

Those skilled in the art will appreciate that the present invention may be used in a variety of applications where MFD matching is desired. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

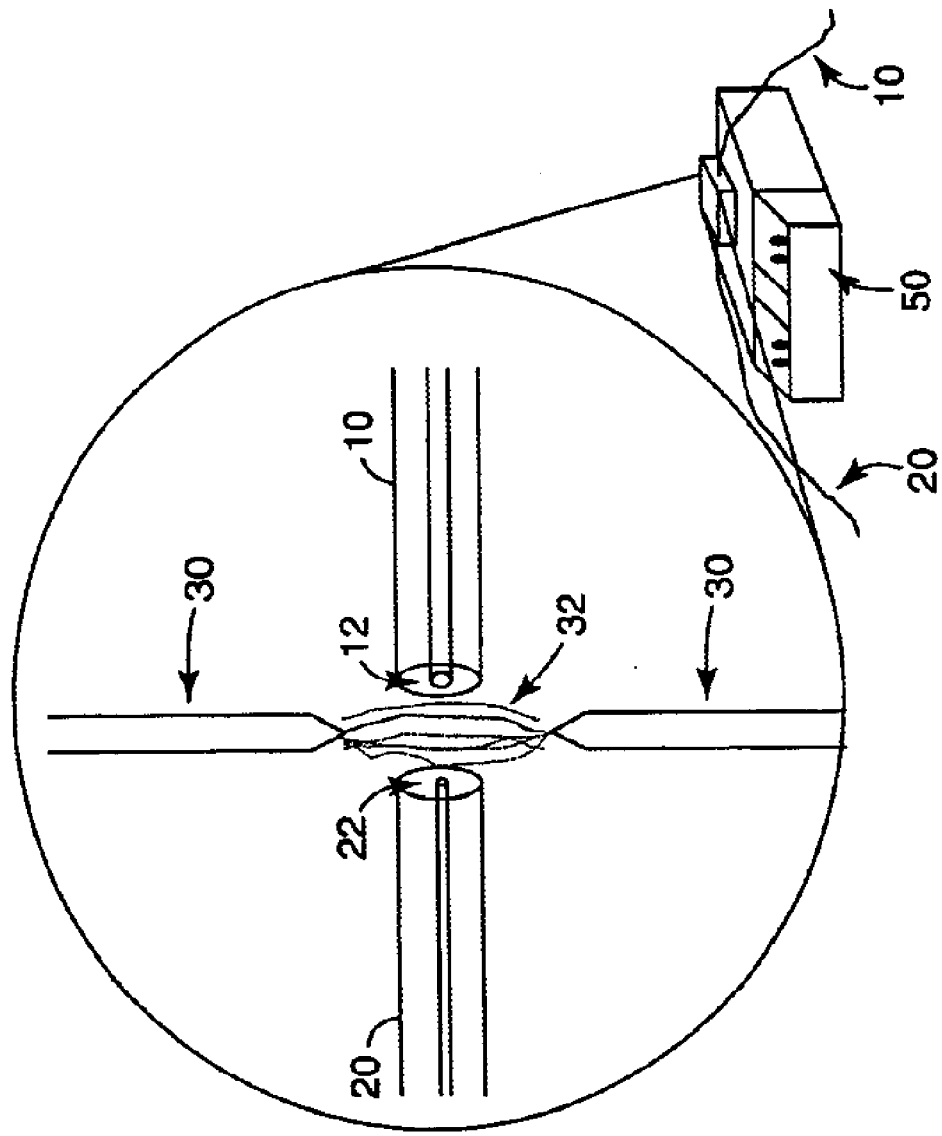

What is claimed is:

1. A fusion splice comprising:
   a) a first optical fiber having a first MFD and a first rate of MFD thermal expansion;
   b) a second fiber having a second MFD and a second rate of MFD thermal expansion, wherein the second MFD is lower than the first MFD;
   c) the second fiber comprising
      i) a core,
      ii) a cladding, radially surrounding the core,
      iii) a zone across the boundary of the core and the cladding having a high concentration of fluorine, and
      iv) at least one diffusion barrier layer;
         wherein the first rate of MFD thermal expansion of the first fiber is less than the second rate of MFD thermal expansion of the second fiber during fusion splicing.

2. The fusion splice of claim 1, wherein the core of the second fiber is erbium doped.

3. The fusion splice of claim 1, wherein the maximum concentration of fluorine in the zone is between 0.5 to 6 mol %.

4. The fusion splice of claim 1, wherein the core is Al doped.

5. The fusion splice of claim 1, wherein the core is Al and La doped.

6. The fusion splice of claim 1, wherein the first fiber has a lesser concentration of index-raising dopants in the core than the second fiber.

7. The fusion splice of claim 1, wherein the first fiber has a lower diffusivity of index-raising dopants in the core than the second fiber.

8. The fusion splice of claim 1, wherein the second rate of MFD change of the second fiber is controlled by the amount of fluorine in the zone.

9. The fusion splice of claim 1, wherein the first fiber also includes a core, a cladding, and a zone of high-concentration of fluorine intermediate the core and the cladding, wherein the rate of MFD change of the first fiber is controlled by the amount of fluorine and the amount of index raising dopants.

10. A broadband amplifier including the fusion splice of claim 1, wherein the first and the second fibers provide amplification for different wavelengths.

11. A broadband amplifier including the fusion splice of claim 1, wherein only the second fiber provides amplification.

12. The broadband amplifier of claim 11, wherein the first fiber is a pump laser combiner.

13. The broadband amplifier of claim 11, wherein the first fiber is a pump laser pigtail.

14. A telecommunication system including the broadband amplifier of claim 10.

15. A telecommunication system including the broadband amplifier of claim 11.

16. A method for fusion splicing a first and a second optical fiber, the method comprising the steps of:
   a) providing a first fiber having a first MFD and a first MFD expansion rate upon heating;
   b) providing a second fiber having a second MFD and a second MFD expansion rate, wherein the second MN) is less than the first MFD, and the second MFD expansion rate is greater than the first MFD expansion rate;
   c) wherein the second fiber comprises
      i) a core
      ii) a cladding radially surrounding the core;
      iii) a high concentration F-ring intermediate the core and the cladding, wherein the average concentration of F in the ring is higher than that of the center of the core or the outer edge of the cladding, and iv) at least one diffusion barrier layer,
wherein the F-ring reduces the rate of MFD expansion of the second fiber when compared to a similar fiber without the F-ring;

d) fusing the first and second fibers by applying heat to the end faces of each fiber and bringing them into close contact and optical alignment, while matching the MFD of the first and second fibers.

17. The method of claim 16 wherein the MFD of both the first and the second fiber are monitored during the step of fusing, wherein the step of applying heat is controlled to achieve MFD matching.

18. The method of claim 16, wherein the rates of MFD expansion of the first and second fiber are known, and the step of applying heat includes applying heat at a predetermined time and temperature that results in the intersection of the MFD expansion curves.

19. A fusion splice comprising:
a) a first optical fiber having a first MFD and a first rate of MFD thermal expansion;
b) a second fiber having a second MFD and a second rate of MFD thermal expansion, wherein the second MFD is lower than the first MFD;
c) the second fiber comprising:
  i) a core
  ii) a cladding, radially surrounding the core,
  iii) a zone across the boundary of the core and the cladding having a high concentration of fluorine, and
  iv) at least one diffusion barrier layer;
d) wherein the first rate of MFD thermal expansion of the first fiber is less than the second rate of ME) thermal expansion of the second fiber controlled by the amount of fluorine in the zone.

* * * * *

UNITED STATES PATENT AND TRADEMARK OFFICE
CERTIFICATE OF CORRECTION

PATENT NO. : 6,742,939 B2
DATED : June 1, 2004
INVENTOR(S) : Sykora, Craig R.

It is certified that error appears in the above-identified patent and that said Letters Patent is hereby corrected as shown below:

Drawings Sheets 1 through 7, delete the drawing sheets in their entirety, and replace with Drawing Sheets 1 through 7 attached herewith.

Column 2,
Line 5, after "MFD" insert -- ) --.

Column 10,
Line 59, delete "MN)" and insert -- MFD -- therefor.

Column 12,
Line 15, delete "ME)" and insert -- MFD -- therefor.

Signed and Sealed this

Third Day of May, 2005

JON W. DUDAS
*Director of the United States Patent and Trademark Office*